United States Patent
Li et al.

(10) Patent No.: US 11,062,034 B1
(45) Date of Patent: Jul. 13, 2021

(54) SYSTEMS AND METHODS FOR IMPROVING APPLICATION ANALYSIS

(71) Applicant: NortonLifeLock Inc., Tempe, AZ (US)

(72) Inventors: Qing Li, Cupertino, CA (US); Brian Varner, Polk City, FL (US); Stan Kiefer, Navarre, FL (US); Samir Kapuria, Bedford, MA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/006,608

(22) Filed: Aug. 28, 2020

(51) Int. Cl.
*G06F 21/54* (2013.01)
*G06F 21/57* (2013.01)

(52) U.S. Cl.
CPC .......... *G06F 21/577* (2013.01); *G06F 21/54* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,660,895 B1* | 5/2017 | Bennett | H04W 40/20 |
| 2017/0277891 A1* | 9/2017 | Keppler | G06F 21/552 |
| 2019/0245870 A1* | 8/2019 | Xu | H04L 67/28 |

\* cited by examiner

*Primary Examiner* — Fatoumata Traore
(74) *Attorney, Agent, or Firm* — FisherBroyles, LLP (57) ABSTRACT

The disclosed computer-implemented method for improving application analysis may include (i) configuring a computing environment to execute an application such that the computing environment spoofs a simulated geolocation that is detected by the application, (ii) performing a dynamic analysis of how the application behaves within the simulated geolocation, and (iii) generating a holistic security analysis of the application based on both a result of the dynamic analysis performed for the simulated geolocation and an additional result of at least one additional dynamic analysis performed for a second geolocation that is distinct from the simulated geolocation. Various other methods, systems, and computer-readable media are also disclosed.

20 Claims, 6 Drawing Sheets

SYSTEMS AND METHODS FOR IMPROVING APPLICATION ANALYSIS

BACKGROUND

There are many ways in which developers of mobile applications can use the geographic location information that is provided to them by calls into the mobile device's operating system. One common use is called geofencing, whereby an application acts differently or presents different information based on the location of the mobile device as returned by embedded function calls into the mobile operating system. In this context, the present disclosure identifies and addresses a need for systems and methods for improving application analysis.

SUMMARY

As will be described in greater detail below, the present disclosure describes various systems and methods for improving application analysis. In one example, a computer-implemented method for improving application analysis may include (i) configuring a computing environment to execute an application such that the computing environment spoofs a simulated geolocation that is detected by the application, (ii) performing a dynamic analysis of how the application behaves within the simulated geolocation, and (iii) generating a holistic security analysis of the application based on both a result of the dynamic analysis performed for the simulated geolocation and an additional result of at least one additional dynamic analysis performed for a second geolocation that is distinct from the simulated geolocation.

In one embodiment, the second geolocation is also simulated. In one embodiment, the second geolocation is non-simulated and indicates an actual location of the computing environment. In one embodiment, the holistic security analysis is based on both the result of the dynamic analysis performed for the simulated geolocation and a set of dynamic analyses performed on a set of multiple different geolocations that are each different from the simulated geolocation.

In one embodiment, the application is configured to engage in geofencing such that the application dynamically alters how the application behaves in one detected geolocation as distinct from how the application behaves in another distinct geolocation. In one embodiment, the holistic security analysis enables a user to be protected from at least one security threat that is geolocation specific such that the security threat only arises when the application detects that the application is executing within a specific corresponding geolocation.

In some examples, configuring the computing environment to execute the application such that the computing environment spoofs the simulated geolocation enables a security provider to perform the dynamic analysis for the simulated geolocation without actually moving the computing environment to an actual location that corresponds to the simulated geolocation. In some examples, configuring the computing environment to execute the application such that the computing environment spoofs the simulated geolocation may include establishing a virtual tunnel between an actual location of the computing environment and an actual location that corresponds to the simulated geolocation.

In some examples, configuring the computing environment to execute the application such that the computing environment spoofs the simulated geolocation may include spoofing GPS coordinates. In some examples, configuring the computing environment to execute the application such that the computing environment spoofs the simulated geolocation may include injecting into the computing environment data indicating that (i) at least one other computing device is connected to a same network access point as the computing device and (ii) the other computing device reports a geolocation that matches the simulated geolocation.

In one embodiment, a system for implementing the above-described method may include (i) a configuration module, stored in memory, that configures a computing environment to execute an application such that the computing environment spoofs a simulated geolocation that is detected by the application, (ii) a performance module, stored in memory, that performs a dynamic analysis of how the application behaves within the simulated geolocation, (iii) a generation module, stored in memory, that generates a holistic security analysis of the application based on both a result of the dynamic analysis performed for the simulated geolocation and an additional result of at least one additional dynamic analysis performed for a second geolocation that is distinct from the simulated geolocation, and (iv) at least one physical processor configured to execute the configuration module, the performance module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) configure a computing environment to execute an application such that the computing environment spoofs a simulated geolocation that is detected by the application, (ii) perform a dynamic analysis of how the application behaves within the simulated geolocation, and (iii) generate a holistic security analysis of the application based on both a result of the dynamic analysis performed for the simulated geolocation and an additional result of at least one additional dynamic analysis performed for a second geolocation that is distinct from the simulated geolocation.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for improving application analysis. The disclosed subject matter may improve upon related technology that performs dynamic analysis of an application executing within a single geolocation that is the only geolocation provided to the application during analysis. This related technology may suffer from the deficiency that, although the dynamic analysis reveals how the application performs when the application detects that it is located within that specific geolocation, the dynamic analysis would fail to reveal how the application behaves when the application detects that it is located within a different geolocation. In other words, some applications today may perform geofencing that dynamically modifies how the applications behave based on which one of different geolocations the applications are detecting. For example, an application might behave differently in Norway than the application behaves in Texas. The related technology would perform a dynamic analysis of the application executing in one of these locations, such as Norway, and thereby fail to detect how the geofencing application behaves differently when the application detects that it is located in Texas. Moreover, to overcome this deficiency without the simulation technique disclosed below, the security analysts managing the dynamic analysis will need to relocate the corresponding computing system (e.g., a smartphone) between different locations, such as traveling between Norway and Texas, in order to properly determine how the application executes when the application detects that it is in each different geolocation. The disclosed subject matter here may improve upon this related technology in a variety of ways, as discussed in more detail below.

Figure 1:
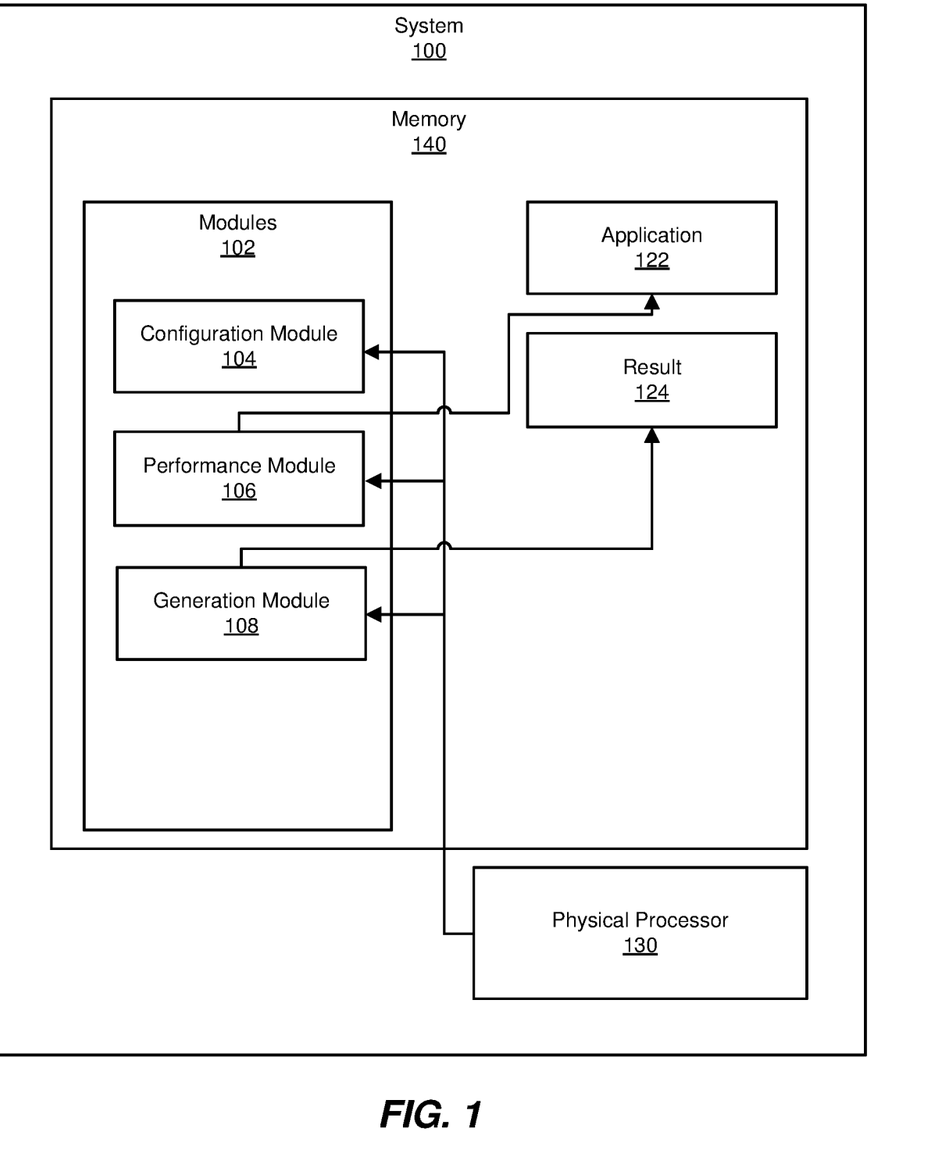
FIG. 1 is a block diagram of an example system for improving application analysis.
Figure 2:
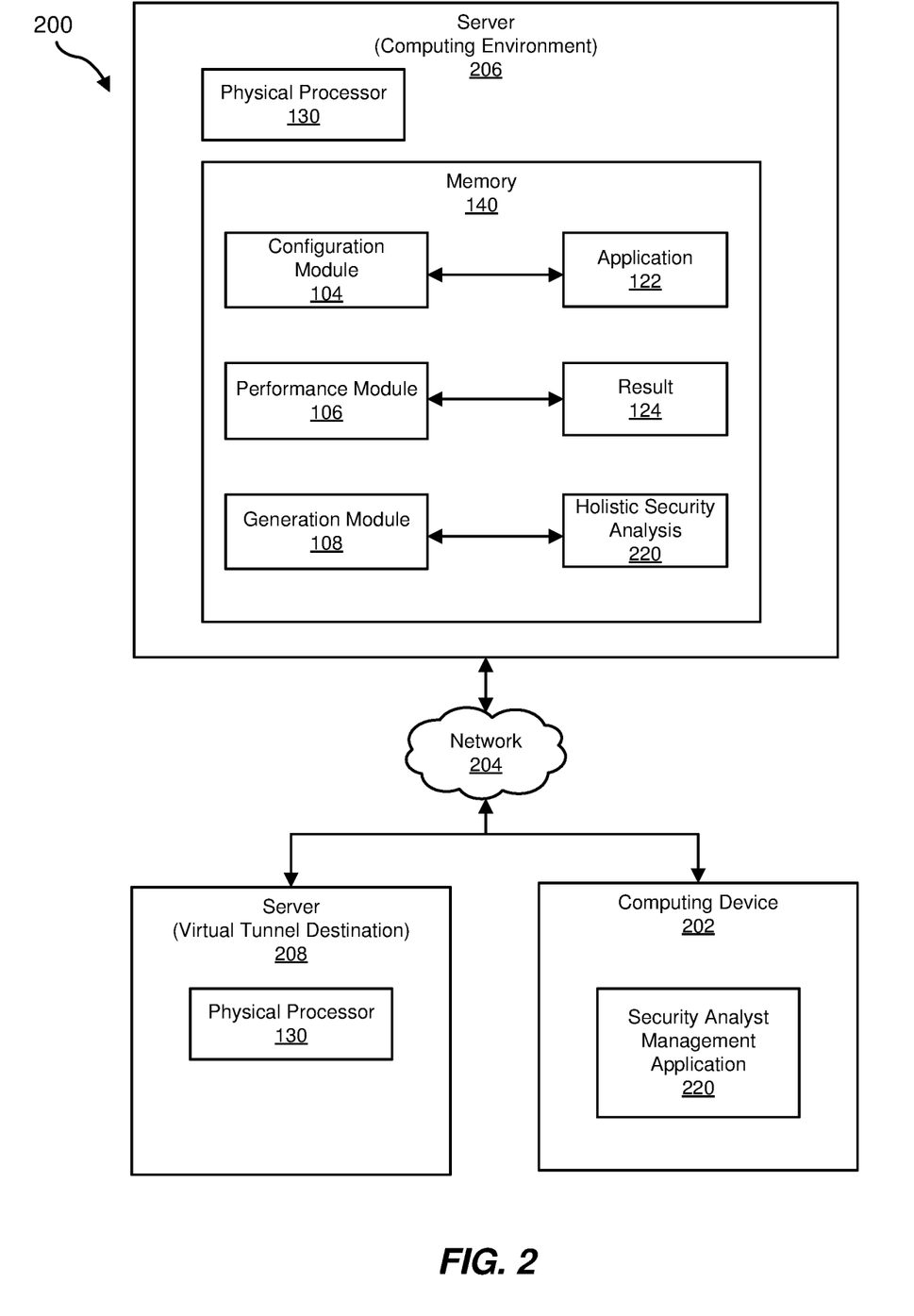
FIG. 2 is a block diagram of an additional example system for improving application analysis.

The following will provide, with reference to FIGS. 1-2, detailed descriptions of example systems for improving application analysis. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for improving application analysis. As illustrated in this figure, example system 100 may include one or more modules 102 for performing one or more tasks. For example, and as will be explained in greater detail below, example system 100 may include a configuration module 104 that configures a computing environment to execute an application 122 such that the computing environment spoofs a simulated geolocation that is detected by application 122. Example system 100 may additionally include a performance module 106 that performs a dynamic analysis of how application 122 behaves within the simulated geolocation. Example system 100 may also include a generation module 108 that generates a holistic security analysis of the application based on both a result 124 of the dynamic analysis performed for the simulated geolocation and an additional result of at least one additional dynamic analysis performed for a second geolocation that is distinct from the simulated geolocation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving application analysis. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to improve application analysis. For example, and as will be described in greater detail below, one or more of modules 102 may cause computing device 202 and/or server 206 to improve application analysis.

For example, and as will be described in greater detail below, configuration module 104 may configure a computing environment, which may correspond to server 206 (e.g., a backend security server of a security vendor such as NortonLifeLock) to execute application 122 such that the computing environment spoofs a simulated geolocation that is detected by application 122. Performance module 106 may perform a dynamic analysis of how application 122 behaves within the simulated geolocation. Generation module 108 may generate a holistic security analysis 220 of application 122 based on both result 124 of the dynamic analysis performed for the simulated geolocation and an additional result of at least one additional dynamic analysis performed for a second geolocation that is distinct from the simulated geolocation.

FIG. 2 also illustrates how server 206 communicates with another server 208, which may correspond to a virtual tunnel destination, as discussed in more detail below regarding step 302 of method 300. Additionally, this figure also illustrates how a security analyst within a backend security laboratory may execute a security analyst management application 230 within computing device 202 to help facilitate the performance of method 300 in coordination with server 206. For example, security analyst management application 230 may instruct configuration module 104 to perform step 302.

Computing device 202 generally represents any type or form of computing device capable of reading computer-executable instructions. In one illustrative example, computing device 202 may correspond to a client device, workstation, or mobile device that a security analyst for a security provider uses to interface with server 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300 or facilitating the performance of method 300. In one illustrative example, server 206 may correspond to a smartphone device that is configured at step 302 of method 300 to analyze how the application behaves within that smartphone device. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
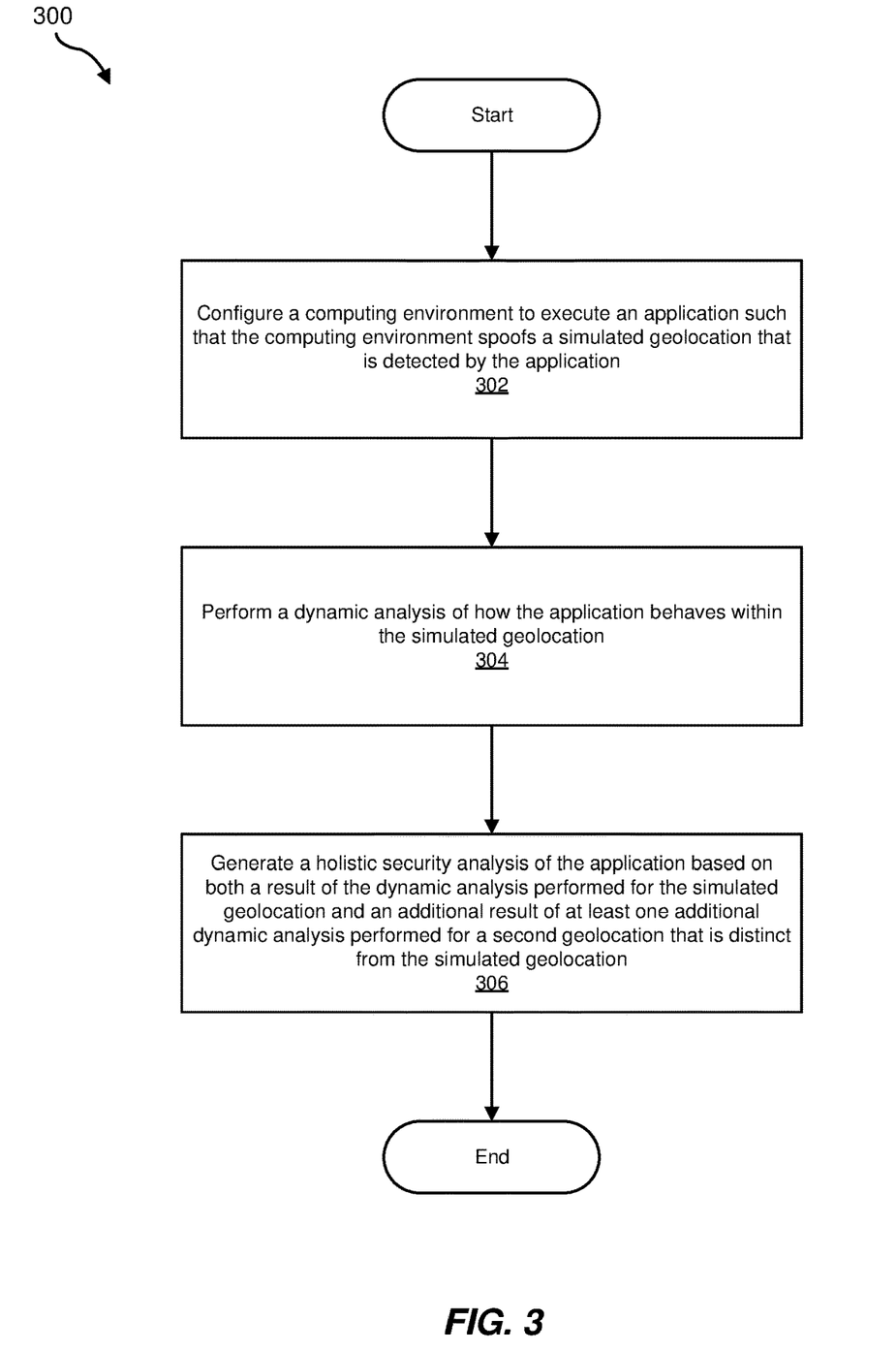
FIG. 3 is a flow diagram of an example method for improving application analysis.

FIG. 3 is a flow diagram of an example computer-implemented method 300 for improving application analysis. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may configure a computing environment to execute an application such that the computing environment spoofs a simulated geolocation that is detected by the application. For example, configuration module 104 may, as part of server 206, configure a computing environment to execute application 122 such that the computing environment spoofs a simulated geolocation that is detected by application 122.

Configuration module 104 may perform step 302 in a variety of ways. In one embodiment, the second geolocation is also simulated. For example, server 206 may be located within a security analyst laboratory in California, and at step 302 configuration module 104 may configure server 206 to spoof the simulated geolocation, such as by spoofing a geolocation of Texas, even though server 206 is actually located in California. Alternatively, in some examples the second geolocation is non-simulated and indicates an actual location of the computing environment. In the example described above, the second geolocation may correspond to California.

In one embodiment, the application is configured to engage in geofencing such that the application dynamically alters how the application behaves in one detected geolocation as distinct from how the application behaves in another distinct geolocation. For example, the application may be programmed to dynamically alter its behavior based on a detected geolocation where the application is executing (i.e., from the perspective of the application). In the example listed above, the application may engage in geofencing to dynamically behave differently when the geolocation of Norway is detected than the application behaves when the geolocation of Texas is detected. For example, the application may disable one or more features that are disallowed or disfavored in one location, while nevertheless enabling these features within the other location.

In some examples, configuration module 104 may configure the computing environment to execute the application such that the computing environment spoofs the simulated geolocation at least in part by enabling a security provider to perform the dynamic analysis for the simulated geolocation without actually moving the computing environment to an actual location that corresponds to the simulated geolocation. In the example listed above, security analysts at the laboratory in California may desire to analyze how the application behaves when the application detects that it is located within Norway or Texas. The fact that the laboratory is located in California rather than being located in Norway or Texas, thereby presents an obstacle to the goal of the security analysts. Rather than relocating the computing environment or server 206 to these additional geolocations (e.g., flying to Norway or Texas), the security analysts and/or configuration module 104 (e.g., configuration module 104 in coordination with the security analysts) may configure the computing environment to spoof the simulated geolocation, such as Norway. Due to the spoofing procedure, from the perspective of the application it is detecting that it is located in Norway, even though the application is actually located in California. Accordingly, the application will proceed to engage in geofencing procedures and dynamically alter how the application will behave based on the fact that the application is detecting that it is located in Norway rather than California.

In some examples, configuration module 104 may configure the computing environment to execute the application such that the computing environment spoofs the simulated geolocation by establishing a virtual tunnel between an actual location of the computing environment and an actual location that corresponds to the simulated geolocation. Returning to FIG. 2, the computing environment may spoof the simulated geolocation by establishing a virtual tunnel between server 208 and server 206. Server 208 may actually be located within a physical geolocation that corresponds to the simulated geolocation. For example, if the simulated geolocation corresponds to Norway, then a virtual tunnel may be formed between server 206 in California and server 208 in Norway. The establishment of the virtual tunnel between server 206 and 208 may facilitate the spoofing of the simulated geolocation, because from the perspective of the application it is receiving and transmitting network traffic through a network node at server 208, without necessarily having any awareness of the actual location within California of server 206.

In some examples, configuration module 104 may configure the computing environment to execute the application such that the computing environment spoofs the simulated geolocation by spoofing GPS coordinates. For example, the application may be configured to request GPS coordinates from an operating system of server 206. Previously, at step 302 configuration module 104 may have configured server 206 to provide a spoof of the GPS coordinates to the application rather than actual and accurate coordinates. Additionally, or alternatively, configuration module 104 may configure the computing environment to execute the application such that the computing environment spoofs the simulated geolocation by spoofing a physical cellular identifier for a cellular connection point to which the computing environment is connected. For example, a cellular connection point may correspond to a tower, gateway, or other cellular network node to which server 206 may be connected. The application may be configured to request and/or receive information from a corresponding cellular connection point to help the application successfully detect an actual geolocation. Nevertheless, at step 302, configuration module 104 may have configured server 206 such that, with respect to an application that performs these requests, the external operating system environment provides to the application a spoofed physical cellular identifier rather than an accurate and correct cellular identifier that indicates an actual location of server 206.

At step 304, one or more of the systems described herein may perform a dynamic analysis of how the application behaves within the simulated geolocation. For example, performance module 106 may, as part of server 206, perform a dynamic analysis of how application 122 behaves within the simulated geolocation.

Performance module 106 may perform step 304 in a variety of ways. In some examples, performance module 106 may execute a series of tests that provide a stimulus to the application and then, for each stimulus, checks whether a response from the application satisfies a security policy. Generally speaking, performance module 106 may autonomously, or in coordination with security analysts in a laboratory of a security provider, analyze how the application is executing within the geolocation that the application is detecting. The analysis may be dynamic in the sense that the analysis is based on how the application actually executes rather than a static analysis that does not necessarily execute the application.

At step 304, performance module 106 may perform the dynamic analysis of how the application behaves in the simulated geolocation. Nevertheless, performance module 106 may also perform one or more additional dynamic analyses for how the application behaves in a set of multiple different geolocations, including optionally the actual geolocation where server 206 is located and/or one or more simulated geolocations that are distinct from the simulated geolocation of step 302. In particular, configuration module 104 and performance module 106 may optionally cycle through an increasing number of simulated geolocations to provide a more comprehensive analysis of how the application behaves in a general sense, and how the application behaves in various different geolocations, as distinct from an analysis that is limited to the application detecting the actual geolocation where server 206 is located.

For example, at step 302 configuration module 104 may configure the application to detect that the application is executing in Norway, even though the application is executing within a computing environment that is located in California. Subsequently, at step 304 performance module 106 may perform a dynamic analysis of how the application executes with the application detecting that the application is located in Norway. At this point, method 300 may optionally return to step 302 to configure the computing environment to spoof another different geolocation that is different from the first simulated geolocation. For example, on this round through the cycle of simulated geolocations, configuration module 104 may optionally configure the computing environment to simulate that the application is executing in Texas, even though the application is actually executing on server 206, which is located in California. In this manner, configuration module 104 and performance module 106 may cycle through steps 302 and 304 an arbitrary number of times (e.g., an integer greater than one) to perform a series of dynamic analyses indicating how the application behaves in each respective simulated geolocation.

Moreover, although the examples listed above outline scenarios where step 302 and step 304 are repeatedly cycled through in series, those having skill in the art understand that the corresponding dynamic analyses for multiple simulated geolocations may be executed partially, or entirely, in parallel, as distinct from being executed in series. Furthermore, although the examples outlined above focus on simulated geolocations, generation module 108 may also optionally base holistic security analysis 220 on a dynamic analysis of how the application behaves when the application detects that it is located within its actual geolocation, as further discussed above. In another example, generation module 108 may omit the results of the dynamic analysis corresponding to the actual geolocation from holistic security analysis 220.

At step 306, one or more of the systems described herein may generate a holistic security analysis of the application based on both a result of the dynamic analysis performed for the simulated geolocation and an additional result of at least one additional dynamic analysis performed for a second geolocation that is distinct from the simulated geolocation. For example, generation module 108 may, as part of server 206, generate holistic security analysis 220 of the application based on both result 124 of the dynamic analysis performed for the simulated geolocation and an additional result of at least one additional dynamic analysis performed for a second geolocation that is distinct from the simulated geolocation.

Generation module 108 may perform step 306 in a variety of ways. In some examples, generation module 108 may simply aggregate the results of performing the different dynamic analyses that are described above, and that correspond to different simulated geolocations. The aggregation of these results may provide material for security analysts of a security provider to gain insights into how the application behaves across a wide variety of different detected geolocations. For example, from the aggregated results, the data analysts and/or generation module 108 may extract patterns that appear from the series of results. As one example, generation module 108 may ascertain that the application enables one feature when the application detects that the application is executing in Europe, whereas the application disables this feature when the application detects that the application is executing in Africa. Moreover, in this example, generation module 108 may base the conclusion regarding Europe and Africa on a series of simulated geolocations for multiple different countries or locations within Europe and multiple different countries or locations in Africa.

In one embodiment, the holistic security analysis is based on both the result of the dynamic analysis performed for the simulated geolocation and a set of dynamic analyses performed on a set of multiple different geolocations that are each different from the simulated geolocation. In other words, as further detailed above, the holistic security analysis may be based on an arbitrary or large number of simulated geolocations, which may be executed in series and/or in parallel, and thereby provide a holistic evaluation of how the application behaves across a wide variety of different geolocations. Such a comprehensive and informative viewpoint of application behavior clearly improves upon the related technology that simply performs a dynamic analysis of how the application behaves when the application detects that the application is located within its actual geolocation.

In one embodiment, the holistic security analysis enables a user to be protected from at least one security threat that is geolocation specific such that the security threat only arises when the application detects that the application is executing within a specific corresponding geolocation. Returning to the illustrative example listed above, the application may have been modified by a malicious administrator to perform geofencing such that the application engages in malicious behavior when the application detects that the application is executing in Norway, whereas the application does not perform this malicious behavior when the application detects that the application is located within California. Accordingly, the performance of method 300 above may enable the user to be protected when the user travels to Norway, even if the security analysts and laboratory never relocate to Norway, by spoofing the geolocation of Norway when performing the dynamic analysis of step 304.

Figure 4:
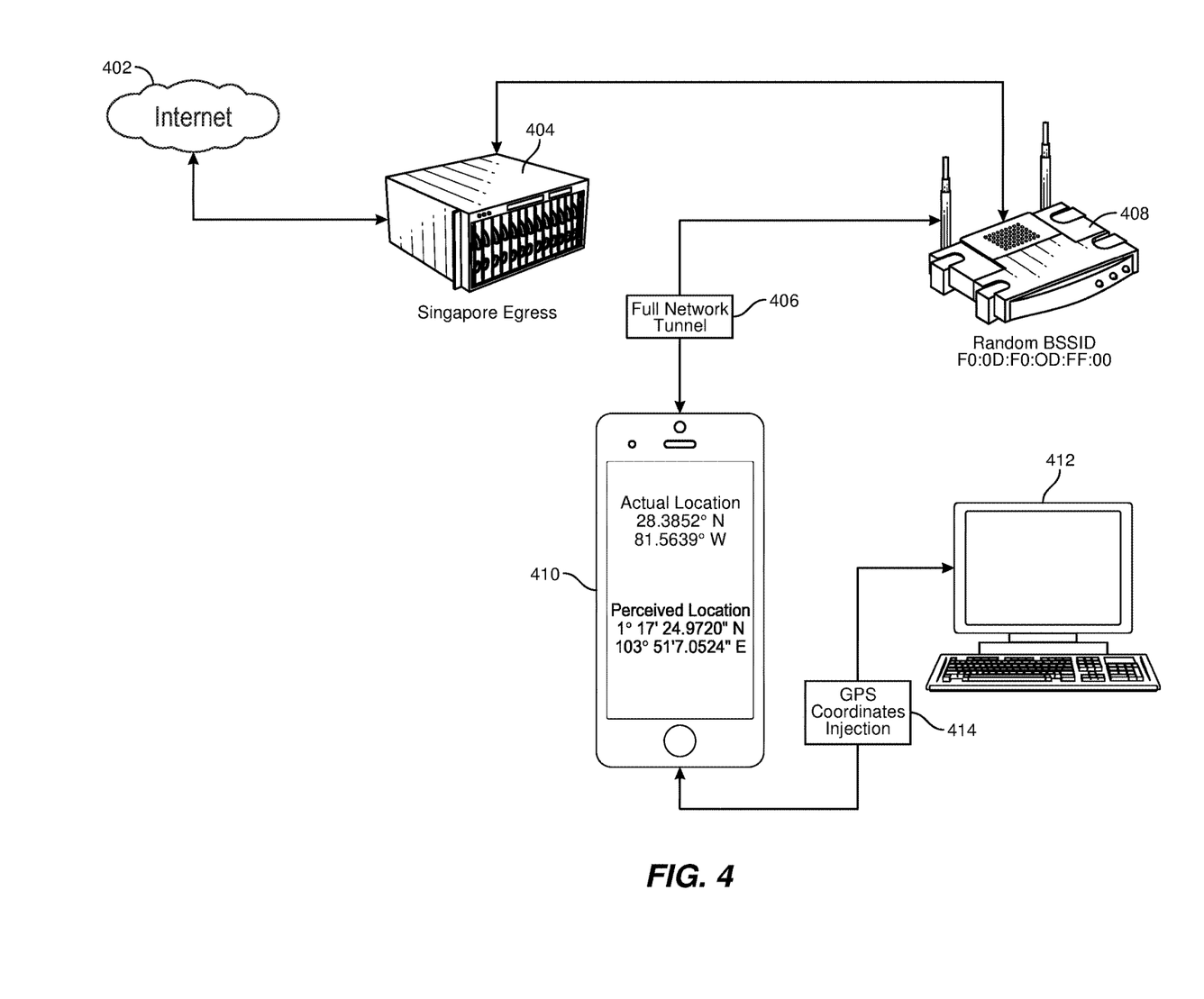
FIG. 4 is a block diagram of an example workflow for improving application analysis.

FIG. 4 shows an illustrative workflow that may correspond to detailed and concrete embodiments of method 300. As shown in this figure, a smartphone 410 may be configured to connect to the Internet 402. Smartphone 410 may be locally connected to a Wi-Fi gateway 408. Nevertheless, as discussed above, configuration module 104 may have spoofed a random BSSID for Wi-Fi gateway 408 that substitutes for an actual BSSID. Similarly, through the connection point at gateway 408, an external operating environment (i.e., external to the application being analyzed) within smartphone 410 may establish a virtual tunnel, or full network tunnel 406, that effectively transports, from the perspective of the application, the application to a different location, such as Singapore. In this particular example, full network tunnel 406 may be established between smartphone 410 and a server named Singapore egress 404. Thus, even though smartphone 410 may be located within a different location, such as California (e.g., and gateway 408 may also optionally be located within the same actual location of California), from the perspective of the application the application may detect a geolocation that corresponds to Singapore.

Similarly, FIG. 4 also illustrates how a workstation 412 may be operated by a security analyst within a laboratory for a security provider to modify the configuration (or instruct the modification of the configuration) of smartphone 410 such that spoofed GPS coordinates are injected as responses to queries for GPS coordinates from the application, rather than the application receiving GPS coordinates that accurately indicate the actual location of smartphone 410. Based on the totality of these various spoofing and simulation procedures, the application executing within smartphone 410 may successfully perceive the illusion that the application is executing within Singapore rather than executing within California, due to the fact that each one of multiple different items of geolocation-relevant information have been effectively spoofed or simulated at the operating system level or by another security application that is executing on the computing device and external to the application under analysis. Accordingly, generation module 108 may generate a holistic security analysis based on a combination of a series of different dynamic analyses performed for multiple different simulated geolocations, as discussed above in more detail in connection with method 300.

The above description provides a detailed overview of method 300. Additionally, the following discussion provides another overview of detailed and concrete embodiments of the disclosed subject matter.

This application may improve upon related technology by combining a method of geolocation spoofing along with a network transportation procedure that indicates to the application that it is executing within a simulated geolocation, as discussed above in connection with server 208. The application may optionally correspond to a mobile application or an application provided by an application distribution platform such as GOOGLE PLAY or the APPLE APP STORE. The disclosed subject matter may enable security analysts to ascertain how the application dynamically behaves in different manners depending on where the application detects that it is located. The disclosed subject matter may also enable security analysts to access applications that are only available to computing devices that are located at a specific geolocation, even if the analysts themselves are not located in that geolocation.

The disclosed subject matter may include two stages: a network transportation stage and a geolocation spoofing stage. Many mobile applications will try to determine the location they are in by various methods. These methods include, but are not limited to, the basic service set identifier ("BSSID") that the mobile device is connected on the WI-Fi network, the physical cellular identifier that the cellular modem is connected to, and/or the GPS coordinates from the GPS receiver that is built into the mobile device. To address each of these items of geolocation-relevant information, the disclosed subject matter may begin by establishing a virtual tunnel to a server 208 that is located in an actual location that corresponds to the geolocation simulated at step 302 and step 304. Accordingly, in these examples configuration module 104 may optionally tear down, deconstruct, remove, or disable one or more cellular, Wi-Fi, Bluetooth, and/or GPS services that are running on the corresponding computing device. Next, configuration module 104 may optionally manipulate one or more files to prevent the application from using a last known location that the application had accurately detected prior to the beginning of method 300. Subsequently, an application programming interface call may optionally be made to a custom Wi-Fi router to change its BSSID to be that of a random identifier so that when the random identifier is reported back it will be different than the one that was previously detected accurately by the computing device, which may correspond to server 206, as discussed above.

Subsequently, a full network tunnel to a virtual server in the country that corresponds to the simulated geolocation is established. After the establishment of this virtual tunnel, one or more various geolocation functions will use the public Internet Protocol address of the egress server for the virtual tunnel to report and corresponding geolocation. In this manner, from the perspective of the application, the application may perceive that it is actually located at the egress server in one country, even though the application is actually executing in a computing device that is located in a different country.

Nevertheless, some applications are configured to attempt to ascertain even higher levels of precision when detecting geolocations. For example, these applications may be configured to seek precision of geolocation information that is more accurate than can be provided through the public Internet Protocol address alone. These applications may also condition successful performance on establishing an authorized location based not just on the Internet Protocol address of the egress server but also one or more items of supplemental information that can be relevant to geolocation detection.

To combat this requirement, configuration module 104 may perform a number of different steps. Generally speaking, configuration module 104 may inject into the operating system of server 206 data indicating that (i) at least one other computing device is connected to a same network access point as server 206 and (ii) the other computing device reports a geolocation that matches the simulated geolocation. In other words, server 206 may also try to manipulate a geolocation detection procedure by manipulating a simulated cellular connection, a Wi-Fi connection, an Internet Protocol address, in totality, to ensure that the operating system will actually believe the simulated geolocation. The operating system of server 206, prior to the performance of step 202, may be configured to conduct various validations and verifications. The operating system may attempt to match the geolocation reported by the device at hand with those of other devices that are attached to the same Wi-Fi access point and/or cellular tower. A failure to detect such a match may alert the operating system to the simulated geolocation effort. To address this additional obstacle, configuration module 104 injects into the computing environment one or more items of additional telemetry information to supplement the geolocation simulation procedure, and server 206 may perform this as a countermeasure to ensure that the operating system also believes the artificial geolocation. In other words, if the operating system itself fails to believe the simulated geolocation, then the operating system may pass one or more cues to the application, thereby preventing the application itself from believing the simulated geolocation.

Additionally, configuration module 104 may optionally configure server 206 to watch a specific version of the application that is specific to the country or coordinates corresponding to the simulated geolocation to which the application is effectively being transported. Configuration module 104 may subsequently report any GPS coordinate data requested by an application on the mobile device as those that are programmed into configuration module 104, as further discussed above. The process can be repeated as needed to virtually move the device around a wide variety of different geolocations around the world. The disclosed subject matter thereby improves upon related technology by providing a higher level of completeness or comprehensiveness, while also providing multilayer accommodations to avoid detection.

Figure 5:
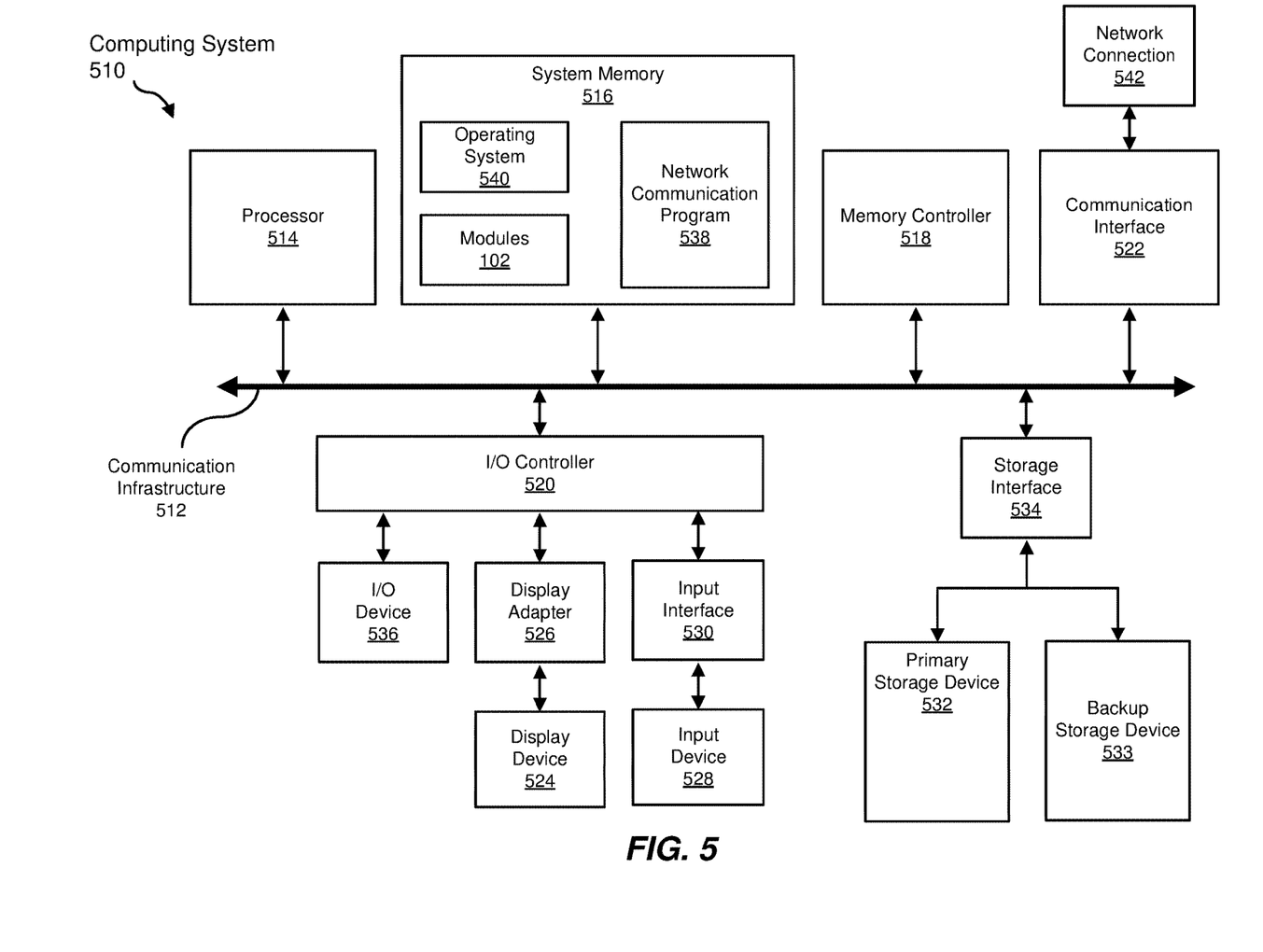
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
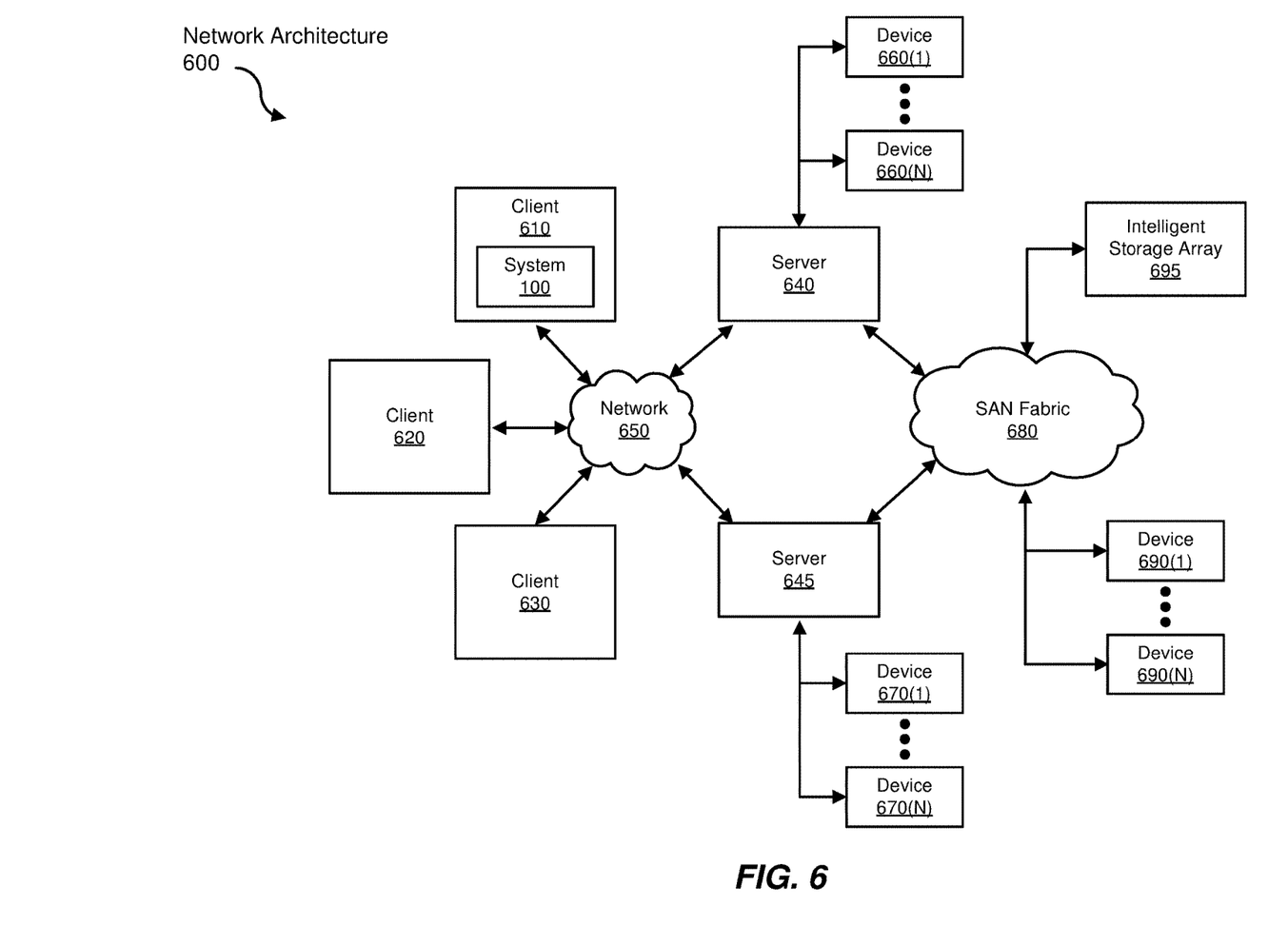
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-

(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for improving application analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving application analysis, at least a portion of the method being performed by a computing device comprising at least one processor, the method comprising:
    configuring a computing environment to execute an application such that the computing environment spoofs a simulated geolocation that is detected by the application;
    performing a dynamic analysis of how the application behaves within the simulated geolocation; and
    generating a holistic security analysis of the application based on both a result of the dynamic analysis performed for the simulated geolocation and an additional result of at least one additional dynamic analysis performed for a second geolocation that is distinct from the simulated geolocation;
    wherein:
    configuring the computing environment to execute the application such that the computing environment spoofs the simulated geolocation comprises establishing a virtual tunnel between an actual location of the computing environment and an actual location that corresponds to the simulated geolocation; and
    a geolocation function uses a public Internet Protocol address of an egress server for the virtual tunnel to report the simulated geolocation such that the application under dynamic analysis perceives that the application is actually located at the simulated geolocation corresponding to the egress server.

2. The computer-implemented method of claim 1, wherein the second geolocation is also simulated.

3. The computer-implemented method of claim 1, wherein the second geolocation is non-simulated and indicates an actual location of the computing environment.

4. The computer-implemented method of claim 1, wherein the holistic security analysis is based on both the result of the dynamic analysis performed for the simulated geolocation and a set of dynamic analyses performed on a set of multiple different geolocations that are each different from the simulated geolocation.

5. The computer-implemented method of claim 1, wherein the application is configured to engage in geofencing such that the application dynamically alters how the application behaves in one detected geolocation as distinct from how the application behaves in another distinct geolocation.

6. The computer-implemented method of claim 5, wherein the holistic security analysis enables a user to be protected from at least one security threat that is geolocation specific such that the security threat only arises when the application detects that the application is executing within a specific corresponding geolocation.

7. The computer-implemented method of claim 1, wherein configuring the computing environment to execute the application such that the computing environment spoofs the simulated geolocation enables a security provider to perform the dynamic analysis for the simulated geolocation without actually moving the computing environment to an actual location that corresponds to the simulated geolocation.

8. The computer-implemented method of claim 1, wherein the actual location of the computing environment and the actual location that corresponds to the simulated geolocation are in different countries.

9. The computer-implemented method of claim 1, wherein configuring the computing environment to execute the application such that the computing environment spoofs the simulated geolocation comprises spoofing GPS coordinates.

10. The computer-implemented method of claim 1, wherein configuring the computing environment to execute the application such that the computing environment spoofs the simulated geolocation comprises injecting into the computing environment data indicating that:
    at least one other computing device is connected to a same network access point as the computing device; and
    the other computing device reports a geolocation that matches the simulated geolocation.

11. A system for improving application analysis, the system comprising:
    a configuration module, stored in memory, that configures a computing environment to execute an application such that the computing environment spoofs a simulated geolocation that is detected by the application;
    a performance module, stored in memory, that performs a dynamic analysis of how the application behaves within the simulated geolocation;

a generation module, stored in memory, that generates a holistic security analysis of the application based on both a result of the dynamic analysis performed for the simulated geolocation and an additional result of at least one additional dynamic analysis performed for a second geolocation that is distinct from the simulated geolocation; and at least one physical processor configured to execute the configuration module, the performance module, and the generation module;

wherein:

the configuration module configures the computing environment to execute the application such that the computing environment spoofs the simulated geolocation at least in part by establishing a virtual tunnel between an actual location of the computing environment and an actual location that corresponds to the simulated geolocation; and a geolocation function uses a public Internet Protocol address of an egress server for the virtual tunnel to report the simulated geolocation such that the application under dynamic analysis perceives that the application is actually located at the simulated geolocation corresponding to the egress server.

12. The system of claim 11, wherein the second geolocation is also simulated.

13. The system of claim 11, wherein the second geolocation is non-simulated and indicates an actual location of the computing environment.

14. The system of claim 11, wherein the holistic security analysis is based on both the result of the dynamic analysis performed for the simulated geolocation and a set of dynamic analyses performed on a set of multiple different geolocations that are each different from the simulated geolocation.

15. The system of claim 11, wherein the application is configured to engage in geofencing such that the application dynamically alters how the application behaves in one detected geolocation as distinct from how the application behaves in another distinct geolocation.

16. The system of claim 15, wherein the holistic security analysis enables a user to be protected from at least one security threat that is geolocation specific such that the security threat only arises when the application detects that the application is executing within a specific corresponding geolocation.

17. The system of claim 11, wherein the configuration module configuring the computing environment to execute the application such that the computing environment spoofs the simulated geolocation enables a security provider to perform the dynamic analysis for the simulated geolocation without actually moving the computing environment to an actual location that corresponds to the simulated geolocation.

18. The system of claim 11, wherein the actual location of the computing environment and the actual location that corresponds to the simulated geolocation are in different countries.

19. The system of claim 11, wherein the configuration module configures the computing environment to execute the application such that the computing environment spoofs the simulated geolocation by spoofing GPS coordinates.

20. A non-transitory computer-readable medium comprising one or more computer-readable instructions that, when executed by at least one processor of a computing device, cause the computing device to:

configure a computing environment to execute an application such that the computing environment spoofs a simulated geolocation that is detected by the application;

perform a dynamic analysis of how the application behaves within the simulated geolocation; and generate a holistic security analysis of the application based on both a result of the dynamic analysis performed for the simulated geolocation and an additional result of at least one additional dynamic analysis performed for a second geolocation that is distinct from the simulated geolocation;

wherein:

configuring the computing environment to execute the application such that the computing environment spoofs the simulated geolocation comprises establishing a virtual tunnel between an actual location of the computing environment and an actual location that corresponds to the simulated geolocation; and a geolocation function uses a public Internet Protocol address of an egress server for the virtual tunnel to report the simulated geolocation such that the application under dynamic analysis perceives that the application is actually located at the simulated geolocation corresponding to the egress server.

* * * * *